(12) United States Patent
Darling et al.

(10) Patent No.: US 9,306,227 B2
(45) Date of Patent: Apr. 5, 2016

(54) FUEL CELL AND FLOW FIELD PLATE FOR FLUID DISTRIBUTION

(75) Inventors: Robert Mason Darling, South Windsor, CT (US); Eric J. O'Brien, Tolland, CT (US)

(73) Assignee: Audi AG, Ingolstadt (DE)

( * ) Notice: Subject to any disclaimer, the term of this patent is extended or adjusted under 35 U.S.C. 154(b) by 928 days.

(21) Appl. No.: 13/258,093

(22) PCT Filed: Apr. 3, 2009

(86) PCT No.: PCT/US2009/039413
§ 371 (c)(1),
(2), (4) Date: Sep. 21, 2011

(87) PCT Pub. No.: WO2010/114558
PCT Pub. Date: Oct. 7, 2010

(65) Prior Publication Data
US 2012/0164559 A1    Jun. 28, 2012

(51) Int. Cl.
*H01M 8/02*    (2006.01)

(52) U.S. Cl.
CPC ............ *H01M 8/026* (2013.01); *H01M 8/0204* (2013.01); *H01M 8/0254* (2013.01); *H01M 8/0258* (2013.01); *H01M 8/0267* (2013.01); *Y02E 60/50* (2013.01)

(58) Field of Classification Search
CPC . H01M 8/0204; H01M 8/026; H01M 8/0254; H01M 8/0258; H01M 8/0267
See application file for complete search history.

(56) References Cited

U.S. PATENT DOCUMENTS

| 7,572,540 B2 | 8/2009 | Yang et al. |
| 2005/0102819 A1* | 5/2005 | Lee et al. ............... 29/592.1 |
| 2006/0024550 A1* | 2/2006 | Rock et al. ............... 429/34 |
| 2007/0207371 A1* | 9/2007 | Ushio et al. ............... 429/38 |
| 2007/0207372 A1* | 9/2007 | Kikuchi et al. ............ 429/38 |

FOREIGN PATENT DOCUMENTS

| EP | 1264360 | 6/2006 |
| JP | 2007234543 A | 9/2007 |

OTHER PUBLICATIONS http://www.merriam-webster.com/dictionar/through; Jul. 13, 2015, p. 1.*
International Preliminary Report on Patentability for PCT/US2009/039413, (Oct. 13, 2011).
Search Report and Written Opinion mailed on Dec. 30, 2009 for PCT/US2009/039413.

* cited by examiner

*Primary Examiner* — Eugenia Wang
(74) *Attorney, Agent, or Firm* — Seed IP Law Group PLLC

(57) ABSTRACT

A flow field plate for use in a fuel cell includes a non-porous plate body having a flow field that extends between first and second ends of the non-porous plate body. The flow field includes a plurality of channels having channel inlets and channel outlets, a fluid inlet portion that diverges from the first end to the channel inlets, and a fluid outlet portion that converges from the channel outlets to the second end. A fuel cell including the flow field plate includes an electrode assembly having an electrolyte between an anode catalyst and a cathode catalyst. The flow field of the flow field plate is side by side with the electrode assembly. A method of processing a flow field plate includes forming the flow field in a non-porous plate body.

19 Claims, 1 Drawing Sheet

FUEL CELL AND FLOW FIELD PLATE FOR FLUID DISTRIBUTION

BACKGROUND OF THE INVENTION

This disclosure relates to flow field plates in a fuel cell. Fuel cells typically include an anode catalyst, a cathode catalyst, and an electrolyte between the anode and cathode catalysts for generating an electric current in a known electrochemical reaction between reactants, such as fuel and oxidant. The fuel cell may include flow field plates with channels for directing the reactants to the respective catalyst. Conventional fuel cells utilize inlet and exit manifolds that extend through the flow field plates to deliver the reactant gases and coolant to the channels and receive exhaust gas and coolant from the channels. The flow field plates are typically rectangular.

The locations of the manifolds often necessitate a multi-pass flow field design in which a reactant flows from one side of the flow field to the other through a first set of channels and turns to flow back across the flow field in another set of channels to make at least several passes over the flow field. One challenge associated with a multi-pass design is achieving high fuel cell performance. For instance, the humidity, temperature, and other properties of the reactant gases change significantly through the channels and can diminish the performance of the fuel cell. Single pass designs with specific arrangements among the fuel, air, and coolant streams have been proposed as a solution to reduce the effects of changes in the humidity and temperature of the gases, for example. However, single pass designs do not provide adequate distribution of the reactant gases to the catalyst to achieve the desired performance with the given packaging and manifold location constraints.

SUMMARY OF THE INVENTION

An example flow field plate for use in a fuel cell includes a non-porous plate body having a flow field that extends between first and second ends of the non-porous plate body. The flow field includes a plurality of channels having channel inlets and channel outlets, a fluid inlet portion that diverges from the first end to the channel inlets, and a fluid outlet portion that converges from the channel outlets to the second end.

An exemplary fuel cell including the flow field plate includes an electrode assembly having an electrolyte between an anode catalyst and a cathode catalyst. The flow field of the flow field plate is side by side with the electrode assembly.

An exemplary method of processing a flow field plate includes forming the flow field in a non-porous plate body such that the flow field extends between first and second ends of the non-porous plate body and includes a plurality of channels having channel inlets and channel outlets, a fluid inlet portion that diverges from the first end to the channel inlets, and a fluid outlet portion that converges from the channel outlets to the second end.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION

Figure 1:
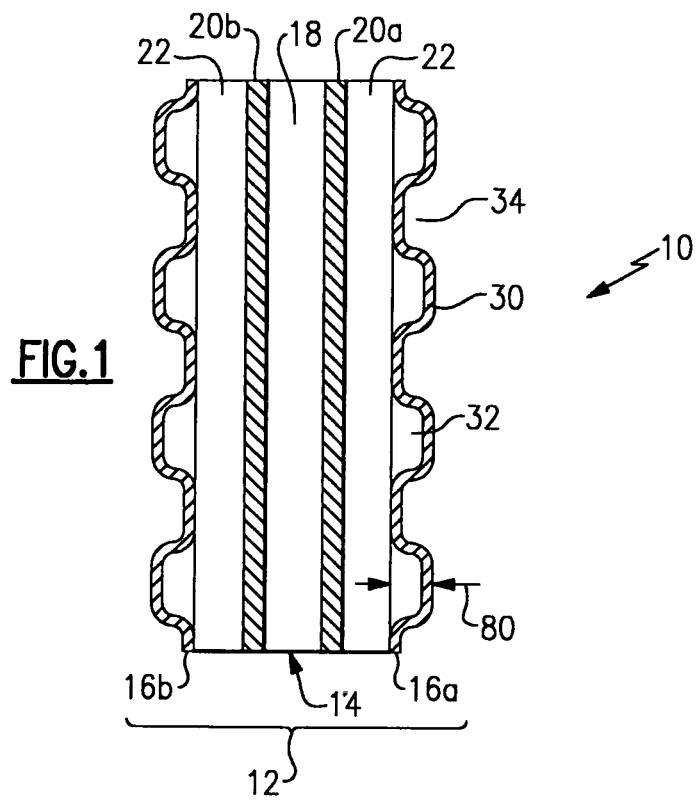
FIG. 1 illustrates a partially exploded view of selected portions of an example fuel cell according to an embodiment of the present invention.

FIG. 1 illustrates a partially exploded view of selected portions of an example fuel cell 10 for generating an electric current in a known electrochemical reaction between reactant gases, for example. It is to be understood that the disclosed arrangement of the fuel cell 10 is only an example and that the concepts disclosed herein may be applied to other fuel cell arrangements.

The example fuel cell 10 includes one or more fuel cell units 12 that may be stacked in a known manner to provide the assembly of the fuel cell 10. Each of the fuel cell units 12 includes an electrode assembly 14 and flow field plates 16a and 16b for delivering reactant gases (e.g., air and hydrogen) to the electrode assembly 14. The flow field plate 16a may be regarded as an air plate for delivering air and the flow field plate 16b may be regarded as a fuel plate for delivering hydrogen. The flow field plate 16a, flow field plate 16b, or both may also circulate coolant (in coolant channels) for maintaining a desired operating temperature of the fuel cell 10 and hydrating the reactant gases indirectly by maintaining the electrode assembly 14 in a desired temperature range.

The electrode assembly 14 may include an electrolyte 18 between a cathode catalyst 20a and an anode catalyst 20b. Gas diffusion layers 22 may be used between the flow field plates 16a and 16b and the electrode assembly 14 to facilitate distribution of the reactant gases.

The flow field plates 16a and 16b may be substantially similar. Thus, the disclosed examples made with reference to the flow field plate 16a may also apply to the flow field plate 16b. In other examples, the flow field plate 16b may be different or include some of the same features as the flow field plate 16a.

The flow field plate 16a includes a non-porous plate body 30. Non-porous refers to the body being solid and free of open pore networks that are known in porous plates for holding or transporting liquid water or other fluids. Thus, the non-porous plate body 30 is a barrier to fluids.

The non-porous plate body 30 includes reactant gas channels 32 and coolant channels 34. The reactant gas channels 32 are located on a side of the flow field plate 16a that faces in the direction of the electrode assembly 14 and the coolant channels 34 are located on the opposite side of the flow field plate 16a. The channels 32 and 34 are linear in the illustrated example; however, given this description, one of ordinary skill in the art will recognize other channel configurations to meet their particular needs.

The flow field plate 16a may be stamped or otherwise formed into the desired shape. In this regard, positive features on one side of the flow field plate 16a are negative features on the other side, and vice versa. Stamping allows the flow field plate 16a to be made at a relatively low cost with a reduced need for machining operations, for example. The flow field plate 16a may be formed from steel, such as stainless steel, or other suitable alloy or material.

Figure 2:
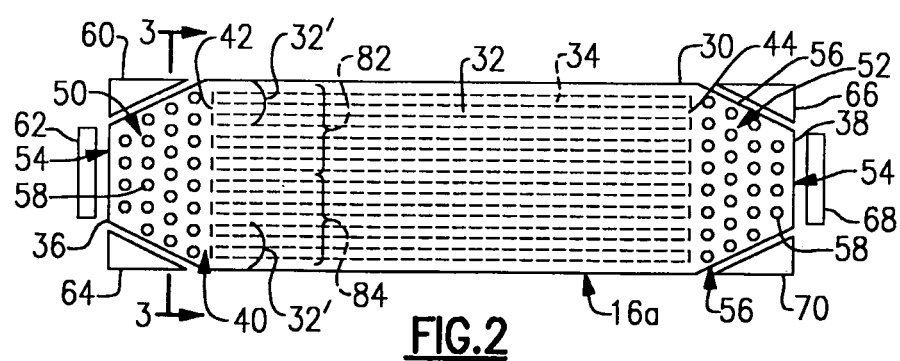
FIG. 2 illustrates an example flow field plate according to an embodiment of the present invention.

FIG. 2 illustrates one side of the flow field plate 16a. It is to be understood that the other side is the negative of the visible side. The channels 32 and 34 include inlets 42 for receiving a fluid (reactant gas or coolant, respectively) and outlets 44 for discharging the fluid from the channels 32 and 34. The flow field plate 16a extends between a first terminal end 36 and a second terminal end 38 of the non-porous plate body 30 and includes a flow field 40. The term "flow field" as used in this disclosure may refer to any or all of the channels 32 and 34 for delivering the air, fuel, and coolant and any other area between the channels 32 and 34 and manifolds for transporting the air, fuel, or coolant. The reactant gas channels 32 may be regarded as a flow field for the reactant gas (air in the case of flow field plate 16a and fuel in the case of flow field plate 16b) and the coolant channels 34 may be regarded as a flow field for coolant.

The flow fields 40 each include a fluid inlet portion 50 and a fluid outlet portion 52. The flow fields 40 of the reactant gases are active areas that are side by side with the electrode assembly 14, for delivering the reactant gases to the electrode assembly 14 (FIG. 1) for the electrochemical reaction. Thus, the fluid inlet portions 50 and the fluid outlet portions 52 are also side by side with a portion of the electrode assembly 14. In the illustrated example, the fluid inlet portion 50 diverges from the first terminal end 36 to the channel inlets 42, and the fluid outlet portion 52 converges from the channel outlets 44 to the second terminal end 38.

The flow field plate 16a includes one fluid inlet portion 50 on one side for delivering reactant gas to the reactant gas channels 32 and another fluid inlet portion 50 (as the negative) on the back side for delivering coolant to the coolant channels 34. Likewise, the flow field plate 16a includes the fluid outlet portion 52 on the visible side in FIG. 2 for collecting the reactant gas and another fluid outlet portion 52 (as the negative) on the back side for collecting the coolant. However, depending on the direction of the flow of the reactant gas and coolant, the back/negative of the visible fluid inlet portion 50 can be a fluid outlet portion 52 and the back/negative of the visible fluid outlet portion 52 can be a fluid inlet portion 50.

In the illustrated example, the flow field plate 16a has an irregular octagonal shape to achieve the divergent and convergent shape. However, the shape is not limited to octagonal, and in other examples the flow field plate 16a may have a different polygonal shape or a non-polygonal shape, such as elliptical, curved and the like, to achieve the divergent and convergent shape.

The fluid inlet portion 50 and the fluid outlet portion 52 may each include a straight end wall 54 and two straight side walls 56 that non-perpendicularly extend from the straight end wall 54. The angle between the side walls 56 and the end wall 54 provides the respective diverging or converging shape. The angles shown may be varied, depending on a desired degree of divergence or convergence, desired amount of active area in the fluid inlet portion 50 or fluid outlet portion 52.

The diverging and converging shapes of the respective fluid inlet portion 50 and fluid outlet portion 52 facilitate distribution of a fluid to the given flow field 40. For instance, the flow of a fluid delivered into the fluid inlet portion 50 follows along the side walls 56 to the outer channels 32' near the edges of the flow field plate 16a. If the side walls 56 were perpendicular to the straight end wall 54, the fluid would not flow smoothly near the corner and flow into the outer channels 32' would be inhibited. By sloping the side walls 56 relative to the end wall 54 to create a divergent shape, the fluid inlet portion 50 more uniformly distributes the fluid to the channels 32. Likewise, the fluid outlet portion 52 converges and thereby funnels the fluid flowing from the channels 32 to facilitate collection of the fluid.

The fuel cell 10 also includes manifolds 60, 62, 64, 66, 68, and 70 to deliver and collect reactant gas and coolant to and from the flow fields 40. The manifolds 60 and 64 are located near the side walls 56 of the fluid inlet portion 50, and the manifold 62 is located near the end wall 54. The manifolds 66 and 70 are located near the side walls 56 of the fluid outlet portion 52, and the manifold 68 is located near the end wall 54.

The individual manifolds 60, 62, 64, 66, 68, and 70 may be used as inlets for delivering the fuel, air, or coolant to a given flow field 40 or as outlets for collecting the fuel, air, or coolant from the given flow field 40 to facilitate fluid distribution or achieve other fuel cell objectives. For instance, a "symmetric" arrangement may be selected in which the flow of each of the fuel, air, and coolant is generally symmetric relative to a reference plane of the fuel cell 10, such as a diagonal plane or mid-plane of the fuel cell 10. In one example, the manifold 62 delivers air and manifold 68 collects the air, manifold 70 delivers fuel and manifold 60 collects the fuel, and manifold 64 delivers coolant and manifold 66 collects the coolant. Thus, the air flows across the fuel cell 10, the fuel flows up (from the lower right to the upper left in FIG. 2), and the coolant flows up (lower left to upper right). Given this description, one of ordinary skill in the art will recognize other symmetric arrangements to meet their particular needs.

Generally, the coolant increases in temperature between the manifolds 64 and 66; the air becomes moister between the manifolds 62 and 68 from byproduct water, and the fuel is relatively dry when entering the manifold 70. Changes in temperature and humidity through the fuel cell 10 can negatively influence the performance of the fuel cell 10 in a known manner. However, the symmetric arrangement limits the influence by providing a single-pass system having a counter-flow (i.e., flow in opposite directions) of the air and fuel, and a co-flow (i.e., flow in the same direction) of the air and coolant through the fuel cell 10. The counter-flow of air and fuel facilitates humidification of the fuel because moist air near the outlet portion 52 can humidify input dry fuel via moisture migration across the electrode assembly 14. The co-flow of air and coolant facilitates humidification of the air because moist air exiting the fuel cell 10 is side by side with hot coolant exiting the fuel cell 10. The heat from the coolant maintains the moisture in an evaporated state. Additionally, coolant in the symmetric arrangement flows upwards to facilitate prevention of bubble entrapment.

In other examples, other "symmetric" arrangements may be selected in which the air flows up or down the fuel cell 10 instead of across, the fuel flows across or down instead of up, and the coolant flows across or down instead of up.

In some examples, an "asymmetric" arrangement may be selected in which the flow of at least one of the air, fuel, or coolant flow is generally not symmetric. In one example, the manifold 62 delivers air and manifold 66 collects the air, manifold 70 delivers fuel and manifold 60 collects the fuel, and manifold 64 delivers coolant and manifold 68 collects the coolant. In another example, the manifold 62 delivers fuel and manifold 70 collects the fuel, manifold 66 delivers air and manifold 64 collects the air, and manifold 68 delivers coolant and manifold 60 collects the coolant. Given this description, one of ordinary skill in the art will recognize other asymmetric arrangements. A portion of the possible asymmetric arrangements may also provide the desired counter-flow and a co-flow; however, the flow through the flow field may not be as uniform as with the symmetric arrangements.

The flow field plates 16a and 16b may include features to promote uniform fluid distribution to the channels 32 and 34. For instance, the fluid inlet portion 50, the fluid outlet portion 52, or both may include one or more flow guides 58 for directing flow. As an example, application Ser. Nos. 13/258,036 and 13/259,245 disclose a few example flow guides and arrangements. The flow guides 58 in the fluid inlet portion 50 may direct fluid from a given one of the manifolds 60, 62, or 64 toward a portion of the channels 32 or 34 that are located farthest away from the given manifold 60, 62, or 64 to promote uniform fluid distribution to the channels 32 or 34. The flow guides 58 in the fluid outlet portion 52 direct fluid from the channels 32 or 34 that are located farthest away from a given manifold 66, 68, or 70 toward the given manifold 66, 68, or 70 to promote uniform fluid collection from the channels 32 or 34.

Figure 3:
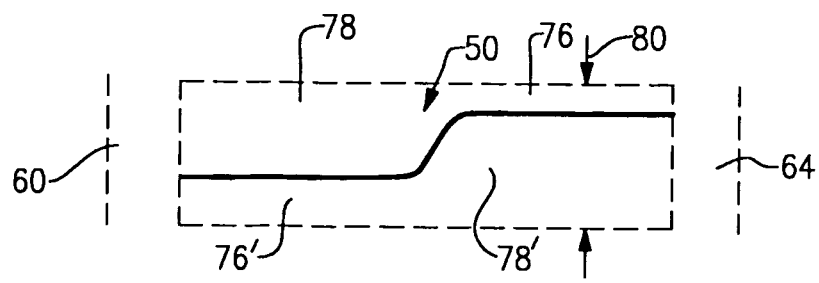
FIG. 3 illustrates a cross-sectional view of an example fluid inlet portion of a flow field plate according to an embodiment of the present invention.

FIG. 3 illustrates a cross-section of the flow field plate 16a at the location shown in FIG. 2, with the flow guides 58 omitted for clarity. The fluid inlet portion 50 may include a variable depth of flow. For instance the fluid inlet portion 50 may include a shallow section 76 and a deep section 78 relative to the shallow section 76 in a thickness direction 80 of the non-porous plate body 30. In this case, the negative of the shallow section 76 is a deep section 78' on the back side of the flow field plate 16a and the negative of the deep section 78 is a shallow section 76' on the back side. The transition between the shallow sections 76, 76' and the deep sections 78, 78' in the illustrated example is relatively gradual; however, in other examples the transition may be more abrupt or more gradual than shown.

The shallow sections 76, 76' and the deep sections 78, 78' facilitate uniform distribution of the fluids to the channels 32 or 34. For instance, a fluid entering the fluid inlet portion 50 through manifold 64 first flows through the shallow section 76 and then into the deep section 78. The deep section 78 provides more fluid to a portion 82 (FIG. 2) of the channels 32 that are located farthest away from the manifold 64 in this case, and the shallow section 76 provides less fluid to a portion 84 of the channels 32 that are close to the manifold 64. Likewise, the fluid outlet portion 52 may include shallow sections 76, 76' and deep sections 78, 78' for facilitating collection of the fluid from far and close channels relative to one of the manifolds 66, 68, or 70. For instance, for manifold 70, the lower half of the fluid outlet portion 52 near manifold 70 may be a shallow section 76, 76' and the upper half may be a deep section 78, 78'.

Alternatively, the middle portion of the fluid inlet portion 50 and the fluid outlet portion 52 may be shallow sections 76, 76' and outer portions may be deep sections 78, 78' (or vice versa) for providing uniform distribution relative to the middle manifolds 62 and 68. The shallow sections 76, 76' and deep sections 78, 78' may be used to facilitate a more uniform flow of the reactant gases or coolant to the given flow fields 40 in asymmetric arrangements.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:
1. A flow field plate for use in a fuel cell, comprising:
a non-porous plate body that interfaces with an interface surface of a gas diffusion layer to define a flow field extending between first and second ends of the non-porous plate body, the flow field including:
a plurality of intermediate flow channels having channel inlets and channel outlets;
a fluid inlet portion that diverges from the first end to the channel inlets; and
a fluid outlet portion that converges from the channel outlets to the second end, wherein at least one of the fluid inlet portion and the fluid outlet portion includes a plurality of upstanding flow guides and a plurality of flow passages extending along a portion of the non-porous plate body among the plurality of upstanding flow guides, and wherein the plurality of flow passages extending along the portion of the non-porous plate body among the plurality of upstanding flow guides have a varying depth of flow through which a fluid moves during operation, the varying depth of flow being defined between a surface of the portion of the non-porous plate body between the plurality of upstanding flow guides and the interface surface of the gas diffusion layer.

2. The flow field plate as recited in claim 1, wherein the flow field comprises an outer perimeter that is octagonal.

3. The flow field plate as recited in claim 1, wherein the flow field comprises an outer perimeter having at least a portion that is curved.

4. The flow field plate as recited in claim 1, wherein the fluid inlet portion includes a straight end wall and two straight side walls extending from the straight end wall at non-perpendicular angles.

5. The flow field plate as recited in claim 1, wherein the plurality of intermediate flow channels are linear.

6. The fluid flow plate of claim 1 wherein the varying depth of flow of the at least one of the fluid inlet portion and the fluid outlet portion varies in a transverse direction, the transverse direction being generally perpendicular to the plurality of intermediate flow channels.

7. The fluid flow plate of claim 1 wherein the at least one of the fluid inlet portion and the fluid outlet portion includes a manifold region, the varying depth of flow varying in a transverse direction that is generally perpendicular to the plurality of intermediate flow channels from a portion of the non-porous plate body adjacent to the manifold region to another portion of the non-porous plate body that is disposed away from the manifold region.

8. A fuel cell comprising:
an electrode assembly including an electrolyte between an anode catalyst and a cathode catalyst; and
the flow field plate of claim 1 with the flow field of the non-porous plate body positioned adjacent the electrode assembly.

9. The fuel cell as recited in claim 8, further comprising a plurality of manifolds adjacent the fluid inlet portion and the fluid outlet portion.

10. The fuel cell as recited in claim 8, wherein each of the fluid inlet portion and the fluid outlet portion includes a straight end wall and two straight side walls extending from the straight end wall at non-perpendicular angles.

11. The fuel cell as recited in claim 10, further comprising a gas reactant manifold adjacent each of the two straight side walls of the fluid inlet portion and the fluid outlet portion.

12. The fuel cell as recited in claim 10, further comprising a coolant manifold adjacent each of the straight wall portion on the fluid inlet portion and the straight wall portion of the fluid outlet portion.

13. The fuel cell as recited in claim 10, further comprising a reactant gas inlet manifold adjacent one of the two straight side walls of the fluid inlet portion for supplying a fluid into the flow field, and a reactant gas outlet manifold adjacent one of the two straight side walls of the fluid outlet portion for discharging the fluid from the flow field.

14. The fuel cell as recited in claim 10, further comprising a coolant inlet manifold adjacent the straight end wall of the fluid inlet portion for supplying a coolant into the flow field, and a coolant outlet manifold adjacent the straight end wall of the fluid outlet portion for discharging the coolant from the flow field.

15. A method of processing a flow field plate for use in a fuel cell, comprising:
forming a flow field in a non-porous plate body that interfaces with an interface surface of a gas diffusion layer to define the flow field such that the flow field extends between first and second ends of the non-porous plate body and includes a plurality of intermediate flow channels having channel inlets and channel outlets, a fluid inlet portion that diverges from the first end to the channel inlets, and a fluid outlet portion that converges from the channel outlets to the second end, and wherein at least one of the fluid inlet portion and the fluid outlet portion includes a plurality of upstanding flow guides and a plurality of flow passages extending along a portion of the non-porous plate body among the plurality of upstanding flow guides, and wherein the plurality of flow passages extending along the portion of the non-porous plate body among the plurality of upstanding flow guides have a varying depth of flow through which a fluid moves during operation, the varying depth of flow being defined between a surface of the portion of the non-porous plate between the plurality of upstanding flow guides and the interface surface of the gas diffusion layer.

16. The method as recited in claim 15, wherein the forming of the flow field includes stamping the non-porous plate body to form the plurality of intermediate flow channels, the fluid inlet portion and the fluid outlet portion.

17. A flow field plate for use in a fuel cell, comprising:
a non-porous plate body that interfaces with an interface surface of a gas diffusion layer to define a flow field extending between first and second ends of the non-porous plate body, the flow field including:
a plurality of intermediate flow channels having channel inlets and channel outlets;
a fluid inlet portion diverging from the first end to the channel inlets; and
a fluid outlet portion converging from the channel outlets to the second end, and
further including at least one of:
the fluid inlet portion including a plurality of upstanding flow guides and a plurality of flow passages extending along a portion of the non-porous plate body among the plurality of upstanding flow guides, wherein the plurality of flow passages extending along the portion of the non-porous plate body among the plurality of upstanding flow guides have a varying depth of flow defined by first and second fluid inlet depths between a surface of the portion of the non-porous plate body between the plurality of upstanding flow guides and the interface surface of the gas diffusion layer, the second inlet depth being in at least a portion of the fluid inlet portion that is adjacent to the channel inlets that are disposed away from an inlet manifold region, and the second inlet depth being greater than the first inlet depth; and
the fluid outlet portion including a plurality of upstanding flow guides and a plurality of flow passages extending along a portion of the non-porous plate body among the plurality of upstanding flow guides, wherein the plurality of flow passages extending along the portion of the non-porous plate body among the plurality of upstanding flow guides have a varying depth of flow defined by first and second fluid outlet depths between a surface of the portion of the non-porous plate body between the plurality of upstanding flow guides and the interface surface of the as diffusion layer, the second outlet depth being in at least a portion of the fluid outlet portion that is adjacent to the channel outlets that are disposed away from an outlet manifold region, and the second outlet depth being greater than the first outlet depth.

18. A flow field plate for use in a fuel cell having a gas diffusion layer, the flow field plate comprising:
a non-porous plate body that interfaces with an interface surface of the gas diffusion layer to define a flow field that extends between first and second ends of the non-porous plate body, the flow field including:
a plurality of intermediate flow channels having channel inlets and channel outlets;
a fluid inlet portion that diverges from the first end of the non-porous plate body to the channel inlets of the intermediate flow channels; and
a fluid outlet portion that converges from the channel outlets of the intermediate flow channels to the second end of the non-porous plate body, and
wherein at least one of the fluid inlet portion and the fluid outlet portion includes a plurality of upstanding flow guides and a plurality of flow passages extending along a portion of the non-porous plate body among the plurality of upstanding flow guides, and wherein the plurality of flow passages extending along the portion of the non-porous plate body among the plurality of upstanding flow guides have a varying depth of flow, the varying depth of flow defined between a surface of the portion of the non-porous plate body between the plurality of upstanding flow guides and the interface surface of the gas diffusion layer.

19. The flow field plate of claim 18 wherein the at least one of the fluid inlet portion and the fluid outlet portion includes a manifold region, the varying depth of flow varying in a transverse direction that is generally perpendicular to the plurality of intermediate flow channels from a portion of the non-porous plate body adjacent to the manifold region to another portion of the non-porous plate body that is disposed away from the manifold region.

* * * * *